June 18, 1957  J. D. DONALDSON  2,796,251
LOAD INDICATING GAUGE FOR VEHICLES
Filed March 16, 1955
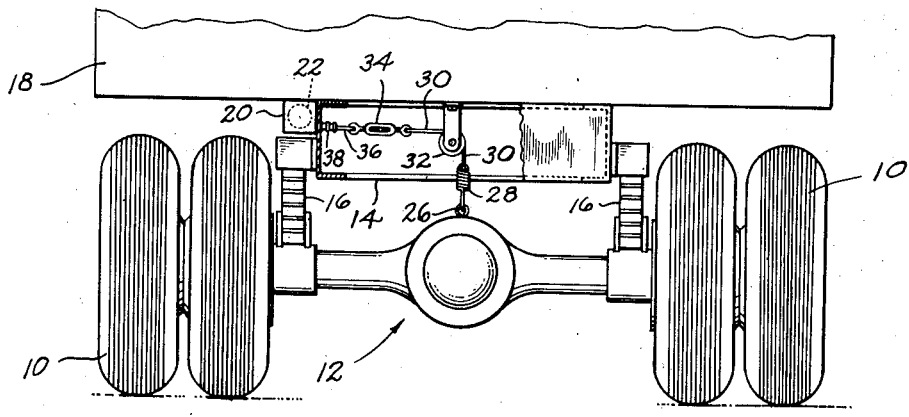
Fig. 1.
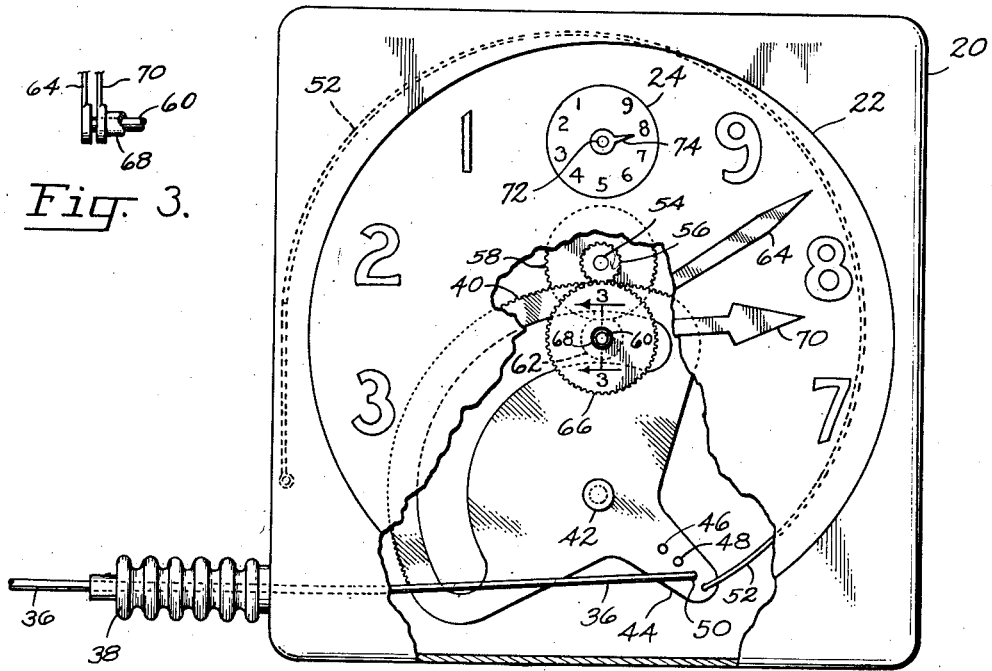
Fig. 3.
Fig. 2.
INVENTOR.
Jack D. Donaldson
BY
Atty.

United States Patent Office 2,796,251
Patented June 18, 1957

2,796,251

LOAD INDICATING GAUGE FOR VEHICLES

Jack D. Donaldson, Chehalis, Wash.

Application March 16, 1955, Serial No. 494,629

3 Claims. (Cl. 265—42)

This invention relates to a load indicating gauge for vehicles and pertains particularly to a gauge for use in indicating the maximum load to be carried by a vehicle, as well as the load actually carried thereby.

Where vehicles such as trucks and railroad freight cars can carry but a stipulated maximum load, and where they are loaded in various locations by different crews, the problem is presented of insuring that the crews are apprised of the maximum load to be carried by the vehicle, and that they measure the load actually carried thereby, to make certain that it does not exceed the stipulated limit. The need for such a device is particularly acute in the logging industry where the loads carried by log trucks and railroad flat cars need to be strictly checked to avoid incurring overweight penalties on the highways and overweight-induced hot boxes on railroads.

Accordingly it is the general object of the present invention to provide a load indicating gauge for railroad cars, trucks and other vehicles which will enable the operator to determine at a glance the maximum load to be carried by the vehicle, and also whether the load actually carried thereby exceeds the permitted limit.

It is still another object of the invention to provide a load indicating gauge for vehicles which indicates the maximum load to be carried by the vehicle, and which may be adjusted easily to indicate different maxima as required by road conditions, the nature and capacity of the vehicle etc.

It is still another object of the invention to provide a load indicating gauge for vehicles which is reliable in operation over a long period of time.

Still another object of the invention is the provision of a load indicating gauge which can be read directly and does not require a presetting operation each time a reading is to be taken.

Still a further object of this invention is the provision of a load indicating gauge for vehicles which will give a graduated reading of the gross and fine load weights.

Still another object of this invention is the provision of a load indicating gauge for vehicles which is sufficiently sensitive to be applied to vehicles such as railroad freight cars where the displacement of the frame relative to the axles upon application of a load is measured in terms of a fraction of an inch.

It is still another object of this invention to provide a load indicating gauge for vehicles which is simple in construction, low in cost and easily installed.

The manner in which the foregoing and other objects of this invention are accomplished will be apparent from the accompanying specification and claims considered together with the drawings, wherein:

Fig. 1 is a rear view in elevation of a truck to which the presently described load indicating gauge has been applied, indicating its manner of application;

Fig. 2 is a detail view in elevation, partly broken away, of the gauge shown in Fig. 1; and Fig. 3 is a detail sectional view taken along line 3—3 of Fig. 2.

The presently described gauge is adaptable for installation on any type of vehicle having an axle supporting a frame through interposed spring means. It is particularly adaptable for use on railroad freight cars, but also may be used on spring supported vehicles of other types. Thus in the drawing it is illustrated as applied to a truck provided in the usual manner with wheels 10 interconnected by an axle and differential assembly 12.

A frame 14 is mounted on the axles through springs 16, and a body 18 is mounted on the frame in the usual manner. The application of a load to body 18 will depress springs 16, reducing the distance separating the body and the axle. Since the amount of such depression is proportional to the load applied, it may be used as a measure of the load and in accordance with the present invention, means are supplied for gauging it.

In the illustrated form, such means are incorporated in a housing 20 which preferably is affixed to the underside of the truck body forwardly of the rear wheels, and facing forwardly so that it is readily visible to the driver. The housing is weather proof and is provided with a first calibrated face 22 marked off in any desired units. It also is provided with a second calibrated face 24 marked off in the same units. The first face is used to gauge the load actually carried by the vehicle; the second to record the maximum or predetermined load to be carried by it.

The gauging mechanism contained in housing 20 is coupled with the axle assembly 12. Accordingly there is provided on the axle assembly a hook 26 to which is connected a spring 28 having for its function absorption of shock as the vehicle traverses a highway or roadbed.

A flexible link member or cable 30 is passed over a pulley 32 and is connected to one end of a turnbuckle 34. To the other end of the turnbuckle is connected a second cable 36 which passes through a side wall of housing 20, the rubber shield 38 being provided for protection of the load indicating mechanism contained within the housing.

In the illustrated embodiment the load indicating mechanism includes a segmental gear 40 which is mounted for angular movement on a shaft 42. Its central portion is cut away and its terminal portion is connected to or has formed integrally with it a lever arm 44.

The end of link member 36 is connected to arm 44 of the segmental gear, means being provided for attaching it thereto at various stations, illustrated by openings 46, 48, 50, depending upon the relative displacement occurring between body 18 and axle assembly 12 of the truck. Thus, when the displacement with applied load is relatively small, as in the case of a railroad flatcar where it amounts to but a fraction of an inch, link member 36 advantageously might be connected to the lever 44 through opening 46 so that even a small movement of the link member is reflected in a relatively large movement of the segmental gear. Conversely, if the gauge is applied to a truck where the displacement of body relative to axle is quite large, then link 36 may be connected to advantage to opening 48 or 50 of the lever arm.

Segmental gear 40 is driven by spring means such as the elongated spring 52, one end of which is attached to the end of lever 44 on the segmental gear and the other to the housing of the gauge. This connection is such that when link member 36, which also is connected to lever 44, is moved to the left as viewed in Fig. 2 by the separation of the vehicle body from its axle, segmental gear 40 is moved in a clockwise direction against the tension of spring 52. However, when link 36 goes slack, as when the distance between the vehicle body and the axle is diminished by the application of a load to the body, then the tension of spring 52 drives the segmental gear in a counterclockwise direction.

Means are associated with the segmental gear for indicating the amount of displacement of the vehicle body relative to the axle, and hence the load carried by the vehicle. For convenience and accuracy in reading, such means include gross load indicating means, which indicates the approximate weight of the load, and fine load indicating means which indicates the lesser gradations in load weight.

To this end a first shaft 54 is fixed to housing 20 adjacent the working surface of segmental gear 40. A first spur gear 56 is rotatable about shaft 54, and meshes with the segmental gear. A second spur gear 58 is also rotatable about shaft 54 but rigid to gear 56. Gears 56 and 58 thus turn together, independently of fixed shaft 54 on which they are mounted.

Rotatably mounted within the housing is a second shaft 60 which is spaced apart from shaft 54 and penetrates the cut-away portion of segmental gear 40. The cutaway portion of this gear is dimensioned so that the gear can move angularly by an amount which will drive the load indicating means between its positions of extreme advancement and retraction. At these two extremes, however, shaft 60 may engage one or the other of the end surfaces of the cut-away portion of the gear which accordingly act as stops to limit the travel of the gear.

A third spur gear 62 is rigid to shaft 60. It is of substantially smaller diameter than is gear 58 with which it meshes. As a result, upon movement of segmental gear 40, shaft 60 will be driven through gears 56, 58 and 62 at a relatively rapid rate. The indicating hand 64 which it carries accordingly will be relatively sensitive to any movement of cable 36 and provides a fine load indicating means.

The gross load indicating means is provided by a fourth spur gear 66 which is rigid to a sleeve 68 carried by the outer end of shaft 60, but relatively movable with respect thereto so that it can turn independently of the shaft. A second indicating hand 70 is rigidly connected to the sleeve. Gear 66 on the sleeve meshes with gear 56 on shaft 54 and is of relatively large diameter. As a result, movement of segmental gear 40 will turn indicating hand 70 at a relatively slow rate and this hand therefore provides a gross load indicating means.

As has been indicated above, dial 22, calibrated in large numbers, has a counterpart in dial 24, calibrated in small numbers. The latter dial has for its function the provision of means for reminding the operator of the maximum load to be placed on the vehicle. For this purpose a shaft 72 with attached pointer 74 is rotatably mounted centrally of the dial face. Pointer 74 is adjustable manually to any desired position on the dial face. Consequently, when set to the maximum load, it serves as a reminder to the operator as the vehicle is being loaded.

*Operation*

The operation of the herein described load indicating gauge is as follows:

After attachment of the gauge to the vehicle, it is calibrated by loading the vehicle with the maximum permissible load. This compresses vehicle springs 16 and reduces the separation of the vehicle frame from the axle to a minimum value. Cable 36 then is connected and/or turnbuckle 34 adjusted until the slack is just out of the cable and the gauge is set at a selected reading, for example, at the numeral 9. At this reading, spring 52 is under very little tension. Also, the end surface of the cut-away portion of segmental gear 40 is adjacent shaft 60 and accordingly may act as a stop to prevent over-running of the gear in one direction.

The vehicle then may be unloaded, whereupon link 36 becomes taut and drives gear 40 in a clockwise direction, placing the indicating hands on zero where further movement of the gear is arrested by contact of shaft 60 with the other end wall of the cut-away portion of the gear. Hence the latter serves as a stop to limit the travel of the gear in this direction also. In this position of the indicating hands, spring 52 is under substantial tension.

Pointer 74 associated with reference dial 24 then may be set to the numeral 9 as a constant reminder to all operators of the vehicle that when indicating arm 70 on dial 22 has reached the numeral 9, the maximum load has been applied.

The gauge assembly now is ready for use. As loads are placed upon the vehicle from time to time, each load will depress the body 18 of the vehicle relative to axle 12. This will cause link 36 to become slack, whereupon spring 52 will drive segmental gear 40 until link 36 again becomes taut, or until the cut-away portion of the segmental gear strikes shaft 60, the amount of displacement of the gear being proportional to the load applied to the vehicle. The gear displacement will be reflected in the reading given by indicator arms 64, 70 on dial 22, the loading being controlled so that this reading does not exceed the limit recorded on reference dial 24.

Each time the vehicle is unloaded the reverse sequence occurs. The distance separating the body of the vehicle from its axle increases and stress is placed on link 36 which accordingly drives the segmental gear in the reverse direction by an amount commensurate with the amount by which the load has been reduced. Indicating arms 64, 70 then will measure the reduced load. When the load has been completely removed, these arms will read zero, and shaft 60 will be positioned adjacent the other end surface of the cut-out portion of the segmental gear 40. The gauge then is in position for taking another reading.

During operation of the vehicle over the highways, shock spring 28 absorbs impact resulting from rough roads or roadbeds, avoiding damage to the gauge. Adjustments to compensate for changes in the resiliency of vehicle springs 16 may be made by manipulation of turnbuckle 34.

Thus it will be apparent that by the present invention I have provided a load indicating gauge which is adaptable for use in a variety of vehicles, including railroad cars and trucks, irrespective of whether a large or small displacement of the vehicle body relative to its axle assembly occurs during loading and unloading. The gauge is sufficiently sensitive to respond to light loads, or to be used with stiff spring assemblies. Also, it is accurate, and is connected with means for checking the applied load against the maximum permitted load as the vehicle is loaded.

It is to be understood that the form of my invention herewith shown and described, represents a preferred embodiment of the same and that various changes in the shape, size and arrangement of parts may be resorted to without departing from the spirit of my invention, or the scope of the subjoined claims.

Having thus described my invention, I claim:

1. A load indicating gauge for vehicles having an axle supporting a frame through interposed spring means, the gauge comprising: a housing, adapted to be mounted on the vehicle frame, a segmental gear mounted for angular movement on the housing, lever means on the segmental gear, flexible link means interconnecting the lever means and the axle of the vehicle, the segmental gear having an arcuate slot therein, concentric shafts mounted on the housing and extending through said slot, thereby forming a stop for limiting the arcuate movement of the segmental gear, a dial, gross and fine load indicating arms adjacent the dial and each connected to one of the concentric shafts, and differential gear means interconnecting the segmental gear and the concentric shafts for moving the arms at a differential rate, thereby indicating on the dial the gross load and fine load readings.

2. A load indicating gauge for vehicles having an axle supporting a frame through interposed spring means, the gauge comprising: a housing adapted to be mounted on the vehicle frame, a segmental gear mounted for angular movement on the housing, lever means on the segmental gear, flexible link means interconnecting the lever means and the axle of the vehicle, a first shaft mounted on the housing, first and second gears rotatably mounted on the first shaft, the first gear meshing with the segmental gear, the segmental gear having an arcuate slot therein, a second shaft mounted on the housing adjacent the first shaft and extending through said slot, thereby forming a stop for limiting the arcuate movement of the segmental gear, a third gear rotatably mounted on the second shaft, the third gear being smaller than the second gear and meshing therewith, a fine load indicating arm on the second shaft, calibrated dial means adjacent the fine load indicating arm, a sleeve mounted on the second shaft for rotation relative thereto, a fourth gear rigid to the sleeve, the fourth gear being larger than the first gear and meshing therewith, and a gross load indicating arm on the sleeve for indicating the gross load on the dial means.

3. A load indicating gauge for vehicles having an axle supporting a frame through interposed spring means, the gauge comprising: a housing adapted to be mounted on the vehicle frame, a segmental gear mounted for angular movement on the housing, lever means on the segmental gear, flexible link means interconnecting the lever means and the axle of the vehicle, and operable to move the lever means in a first direction upon removal of a load from the vehicle frame, resilient means connected to the lever means and operable to move the lever means in the reverse direction upon application of a load to the frame, a first shaft mounted on the housing, first and second gears rotatably mounted on the first shaft, the first gear meshing with the segmental gear, the segmental gear having an arcuate slot therein, a second shaft mounted on the housing adjacent the first shaft and extending through said slot, thereby forming a stop for limiting the arcuate movement of the segmental gear, a third gear rotatably mounted on the second shaft, the third gear being smaller than the second gear and meshing therewith, a fine load indicating arm on the second shaft, calibrated dial means adjacent the fine load indicating arm, a sleeve mounted on the second shaft for rotation relative thereto, a fourth gear rigid to the sleeve, the fourth gear being larger than the first gear and meshing therewith, and a gross load indicating arm on the sleeve for indicating the gross load on the dial means.

References Cited in the file of this patent
UNITED STATES PATENTS

| | | |
|---|---|---|
| 557,194 | Day | Mar. 31, 1896 |
| 1,350,498 | Hallner | Aug. 24, 1920 |
| 1,763,636 | Anderson | June 17, 1930 |
| 2,024,313 | Urfer | Dec. 17, 1935 |
| 2,129,343 | Clemens | Sept. 6, 1938 |
| 2,435,289 | Raney | Feb. 3, 1948 |
| 2,450,644 | Donaldson | Oct. 5, 1948 |